Patented Dec. 13, 1938

2,140,258

UNITED STATES PATENT OFFICE 2,140,258

ACCELERATORS

Albert M. Clifford, Stow, Ohio, assignor to Wingfoot Corporation, Wilmington, Del., a corporation of Delaware No Drawing. Application September 27, 1934, Serial No. 745,757

17 Claims. (Cl. 18—53)

This invention relates to reaction products which are accelerators for the vulcanization of rubber. The invention includes the new reaction products, the method of preparing them, the method of vulcanizing rubber using the reaction products as accelerators of vulcanization, and rubber cured in their presence.

The new reaction products are obtained from aldehydes and substituted alicyclic amines, i. e. amines in which at least one bond of the nitrogen is satisfied by a cyclic group which contains at least one saturated carbon atom, that is one carbon atom which is not connected to another carbon atom by a double or triple bond. The cyclic group is substituted by one or more groups, such as alkyl, alkoxy, hydroxy, amine, etc. These alicyclic amines include compounds which contain a benzene or naphthalene or other ring which has been partially or completely hydrogenated, such as the amines obtained by partial or complete hydrogenation of o- and p-anisidines, 2-amino diphenyl, 4-amino diphenyl, benzidine, p-amino methyl diphenyl, o-amino di para tolyl, para phenylene diamine, o-amino phenol, p-amino phenol, amino hydroxy diphenyls, phenyl ethylene diamine, tolyl ethylene diamine, alpha amino beta naphthol, para dimethyl amino aniline, tolidine, 2-4 diamino diphenyl amine, p-1' diamino diphenyl methane, alpha methyl beta naphthylamine, beta methyl alpha naphthylamine, etc.

Aldehydes which may be used in preparing the new reaction products include both aliphatic aldehydes and aromatic aldehydes in which the radical attached to the aldehyde group may be a hydrocarbon group or a substituted hydrocarbon group, and in the case of aliphatic aldehydes, the aliphatic grouping may be saturated or unsaturated. They include such compounds as hydroxy naphthaldehyde, aldol, acrolein, propion aldehyde, alpha ethyl beta propyl acrolein, chloro butyraldehyde, furfuraldehyde, formaldehyde, acetaldehyde, crotonaldehyde, butyraldehyde, etc.

The reaction products which are accelerators of rubber may be used in the usual way by mixing the accelerator with rubber and a vulcanizing agent and antioxidants, fillers, etc. with or without an activator as desired, and curing the mix. It will be found that by the addition of these accelerators the time of cure is materially shortened.

The reaction products may be prepared by mixing the aldehyde and the substituted alicyclic amine. Although the aldehyde and amines produce an exothermal reaction, in general it will be necessary to apply some heat to carry the reaction to completion. The aldehyde and amine may be mixed in different proportions varying, for example, from two mols of amine and one mol of aldehyde to the use of a large excess of the aldehyde. Mixtures of the aldehydes may be reacted with mixtures of the amines. The reaction may be carried out in the absence of solvents. Examples of the preparation of the reaction products are

*Example 1.—o-Methyl cyclohexyl amine and formaldehyde*

Forty-one parts by weight of formalin were added to 56.5 parts by weight of o-methyl cyclohexylamine, with cooling. The product was then heated to 85–95° C. for two hours. The product gradually solidified on standing. It was filtered off from the water and dried. The melting point ranged from 66–85° C.

*Example 2.—Hexa hydro xylidines and crotonaldehyde*

The addition of 21.0 parts by weight of crotonaldehyde to 38.1 parts by weight of a mixture of hexahydro xylidines (with cooling) caused an exothermic reaction to take place with the separation of water. The water was gradually removed by heating to 170° C. The residue was a dark liquid. The product was used directly as an accelerator.

*Example 3.—Hexa hydro o-phenetidine and crotonaldehyde*

By the addition of 17.5 parts by weight of crotonaldehyde to 35.6 parts by weight of hexahydro o-phenetidine (with cooling) an exothermic reaction resulting in the separation of water took place. The latter was removed by heating to 170° C., leaving a red liquid residue. This product is a good accelerator.

As representative of the process of vulcanizing rubber in the presence of these reaction products the following test results are given. They were obtained with stocks composed as follows:

| | Parts by weight |
|---|---|
| Extracted pale crepe rubber | 100.0 |
| Zinc oxide | 5.0 |
| Sulfur | 3.0 |
| Stearic acid | 1.5 |
| Accelerator | 0.5 |

Test samples prepared in this way were all cured at 260° F. for varying lengths of time as indicated below and the following test data obtained. The ultimate tensile strength is given, expressed in kg/sq. cm. The maximum elongation is given expressed in per cent. The modulus at 500% and 700% elongation is given expressed in kg/sq. cm.

| Cure | Tensile | Elongation | 500 | 700 |
|---|---|---|---|---|
| *o-Methyl cyclohexyl amine and formaldehyde* | | | | |
| 20/260 | 33 | 975 | 6 | 9 |
| 40 | 98 | 920 | 11 | 29 |
| 60 | 114 | 870 | 14 | 43 |
| *o-Methyl cyclohexyl amine and crotonaldehyde* | | | | |
| 10/260 | 30 | 975 | 5 | 9 |
| 20 | 83 | 890 | 11 | 30 |
| 40 | 124 | 800 | 20 | 70 |
| 60 | 135 | 775 | 24 | 86 |
| *p-Methyl cyclohexyl amine and formaldehyde* | | | | |
| 20/260 | 32 | 975 | 5 | 8 |
| 40 | 75 | 940 | 9 | 21 |
| 60 | 100 | 890 | 12 | 34 |
| 80 | 104 | 830 | 15 | 48 |
| *p-Methyl cyclohexyl amine and crotonaldehyde* | | | | |
| 10/260 | 90 | 910 | 12 | 30 |
| 20 | 118 | 830 | 20 | 58 |
| 40 | 152 | 790 | 24 | 90 |
| 60 | 162 | 750 | 31 | 123 |
| *Hexa hydro xylidines and formaldehyde* | | | | |
| 20/260 | 4 | 660 | 3 | ----- |
| 40 | 60 | 930 | 7 | 18 |
| 60 | 76 | 790 | 14 | 47 |
| 80 | 90 | 780 | 16 | 53 |
| *Hexa hydro xylidines and crotonaldehyde* | | | | |
| 15/260 | 60 | 950 | 7 | 17 |
| 20 | 89 | 910 | 9 | 30 |
| 40 | 120 | 775 | 19 | 75 |
| 60 | 136 | 725 | 27 | 114 |
| *Hexa hydro xylidines and butyraldehyde* | | | | |
| 40/260 | 17 | 900 | 4 | 7 |
| 60 | 46 | 780 | 11 | 32 |
| 80 | 52 | 760 | 11 | 34 |
| 120 | 101 | 740 | 21 | 79 |
| *Hexa hydro phenetidine and formaldehyde* | | | | |
| 20/260 | 18 | 875 | 4 | 9 |
| 40 | 64 | 870 | 10 | 27 |
| 60 | 87 | 740 | 19 | 64 |
| 80 | 106 | 760 | 19 | 74 |

I claim:

1. The reaction products of aldehydes and alicyclic primary amines containing at least one substituent in the alicyclic ring selected from the group consisting of alkyl, alkoxy, hydroxy and amino radicals.

2. An accelerator of vulcanization which comprises a reaction product of an aldehyde and an alicyclic primary amine containing at least one substituent in the alicyclic ring selected from the group consisting of alkyl, alkoxy, hydroxy and amino radicals.

3. As an accelerator of vulcanization the reaction product of an alkoxy cyclohexyl primary amine and an aldehyde.

4. As an accelerator of vulcanization the reaction product of an alkyl cyclohexyl primary amine and an aldehyde.

5. As an accelerator of vulcanization, the reaction product of o-methyl cyclohexyl amine and formaldehyde.

6. As an accelerator of vulcanization, the reaction product of p-methyl cyclohexyl amine and crotonaldehyde.

7. As an accelerator of vulcanization, the reaction product of hexa hydro phenetidine and crotonaldehyde.

8. The method of treating rubber which comprises vulcanizing the rubber in the presence of an accelerator which comprises a reaction product of an aldehyde and an alicyclic primary amine containing at least one substituent in the alicyclic ring selected from the group consisting of alkyl, alkoxy, hydroxy and amino radicals.

9. The method of treating rubber which comprises vulcanizing the rubber in the presence of an accelerator which is the reaction product of an aliphatic aldehyde and a methyl cyclohexyl primary amine.

10. The method of treating rubber which comprises vulcanizing the rubber in the presence of an accelerator which is the reaction product of o-methyl cyclohexyl amine and formaldehyde.

11. The method of treating rubber which comprises vulcanizing the rubber in the presence of an accelerator which is the reaction product of p-methyl cyclohexyl amine and crotonaldehyde.

12. The method of treating rubber which comprises vulcanizing the rubber in the presence of an accelerator which is the reaction product of hexa hydro phenetidine and crotonaldehyde.

13. Rubber which has been vulcanized in the presence of a reaction product of an aliphatic aldehyde and an alkoxy alicyclic primary amine.

14. Rubber, the vulcanization of which has been accelerated by the presence of a reaction product of an aldehyde and a methyl cyclohexyl primary amine.

15. Rubber which has been vulcanized in the presence of the reaction product of o-methyl cyclohexyl amine and formaldehyde.

16. Rubber which has been vulcanized in the presence of the reaction product of p-methyl cyclohexyl amine and crotonaldehyde.

17. Rubber which has been vulcanized in the presence of the reaction product of hexa hydro phenetidine and crotonaldehyde.

ALBERT M. CLIFFORD.